(12) United States Patent
Gilg

(10) Patent No.: US 7,833,004 B2
(45) Date of Patent: Nov. 16, 2010

(54) DEMOULDING STATION

(75) Inventor: Franz Xaver Gilg, Polling (DE)

(73) Assignee: Weckerle GmbH, Weilheim (DE)

( * ) Notice: Subject to any disclaimer, the term of this patent is extended or adjusted under 35 U.S.C. 154(b) by 546 days.

(21) Appl. No.: 11/578,082

(22) PCT Filed: Apr. 15, 2005

(86) PCT No.: PCT/EP2005/004037

§ 371 (c)(1),
(2), (4) Date: Jun. 19, 2007

(87) PCT Pub. No.: WO2005/099988

PCT Pub. Date: Oct. 27, 2005

(65) Prior Publication Data

US 2008/0036112 A1 Feb. 14, 2008

(30) Foreign Application Priority Data

Apr. 15, 2004 (DE) .................. 10 2004 018 251

(51) Int. Cl.
*B29C 33/50* (2006.01)
(52) U.S. Cl. .................. 425/441; 264/334; 425/437; 425/444; 425/DIG. 32
(58) Field of Classification Search .................. 425/441, 425/444, DIG. 32, 556, 437; 264/334, 138
See application file for complete search history.

(56) References Cited

U.S. PATENT DOCUMENTS

| 2,263,302 | A | * | 11/1941 | Johnson | 425/507 |
| 2,564,624 | A | * | 8/1951 | Hoos | 29/525 |
| 3,493,309 | A | * | 2/1970 | Grisel | 401/78 |
| 5,141,430 | A | * | 8/1992 | Maus et al. | 425/556 |
| 2002/0086079 | A1 | * | 7/2002 | Kuo | 425/405.1 |
| 2004/0137101 | A1 | * | 7/2004 | Avalle | 425/117 |

FOREIGN PATENT DOCUMENTS

DE 900544 7/1949
FR 2468455 A1 10/1979

* cited by examiner

*Primary Examiner*—Yogendra N Gupta
*Assistant Examiner*—Emmanuel S Luk
(74) *Attorney, Agent, or Firm*—Howard & Howard Attorneys PLLC

(57) ABSTRACT

Method and apparatus for demolding (1) of molded material (2) out of a mold (3), in particular for demolding lipstick leads, wherein said apparatus for demolding (1) comprises means with which the molded material (2) can be selectively demolded with one of at least two different techniques.

9 Claims, 4 Drawing Sheets

DEMOULDING STATION

The present invention relates to an apparatus for demolding of molded materials out of a mold, in particular for demolding lipstick leads.

For the production of lipstick leads, the lipstick material is filled in a mold in a hot and liquid condition and is cooled down there, until the material is sufficient rigid. For removing the molded material out of the mold, the so-called demolding, various techniques are known in the prior art wherein each technique has different advantages and disadvantages.

According to one technique known in the prior art, the molded material is slid out of the mold after the cooling down. Such a sliding technique is in particular advantages for thin cylindrical lipstick leads, so called slimliner.

According to a further technique known in the prior art, the molded material is pushed out of the mold by means of compressed air after the cooling down. Such a blow out technique is naturally used for lipstick leads with a classical shape.

Both techniques have among other things the disadvantage that for the demolding the use of a release agent is necessary.

In the prior art a further technique for demolding is known, according to which the mold consists of a flexible material and the mold is expanded by means of negative pressure such that the inner surface of the mold peals away from the molded and cooled down material and the material can simply be removed out of the mold by means of a gripper. This technique can be used for classical lipstick leads as well as for thin cylindrical lipstick leads. Due to the flexible material, the molds used in this technique have however a shorter endurance. Furthermore, this technique requires that for different materials different molds are used.

Each of the apparatuses for producing lipstick leads known in the prior art can carry out only one technique for demolding. Therefore, the purchaser of such an apparatus must already decide during the purchase of such an apparatus which technique is the most reasonable technique for him.

Therefore, the object of the present invention is to provide an apparatus in which the advantages of the various demolding techniques are combined in one apparatus.

According to the invention, the object is solved by an apparatus for demolding molded materials out of a mold, in particular for demolding of lipstick leads. The apparatus for demolding comprises means with which the molded material can be selectively demolded with one of at least two different techniques, preferably with one of at least three different techniques.

By means of the apparatus for demolding according to the present invention, one out of a plurality of possible demolding techniques can be selected so that the advantages specific for the respective techniques can be employed. By the apparatus for demolding according to the present invention, different kinds of lipstick leads could therefore be optimal produced with one demolding apparatus. The apparatus for demolding according the present invention is thereby one unit which can be used in connection with the different techniques due to its means.

In a preferred embodiment of the invention, the apparatus comprises means for a technique according to which the molded material is slid out of the mold by means of a sliding mechanism. Preferably, the sliding mechanism comprises therefore a plunger for sliding out the molded material.

In a further preferred embodiment of the invention, the apparatus comprises means for a technique according to which the molded material is pushed out of the mold by means of compressed air. For that, the apparatus comprises preferably at least one opening through which the compressed air for pushing out the molded material may be provided.

Preferably, the apparatus according the present invention comprises means for a technique according to which for removing the molded material the mold is expanded by means of negative pressure. The means comprises preferably at least on opening through which the negative pressure for expanding the mold may be provided.

The apparatus according to the present invention comprises preferably a plunger for sliding out the molded material out of the mold, wherein the plunger comprises at least one opening through which selectively compressed air for pushing out the molded material out of the mold or a negative pressure for expanding the mold may be provided.

In a preferred embodiment of the present invention, the techniques used for demolding can automatically be changed.

According to invention, the object is also solved by a device for producing lipstick leads from a liquid material, wherein the device for producing of lipstick leads comprises an apparatus for demolding with means with which the molded material can be selectively demolded with one of at least two different techniques, preferably with one of at least three different techniques.

In a further preferred embodiment of the present invention, the object is solved by a method for producing lipsticks from a liquid material, wherein in a selecting step one of at least two techniques for demolding is selected.

In the following, examples for embodiments of the invention are described by means of the accompanying drawings, in which.

Figure 1:
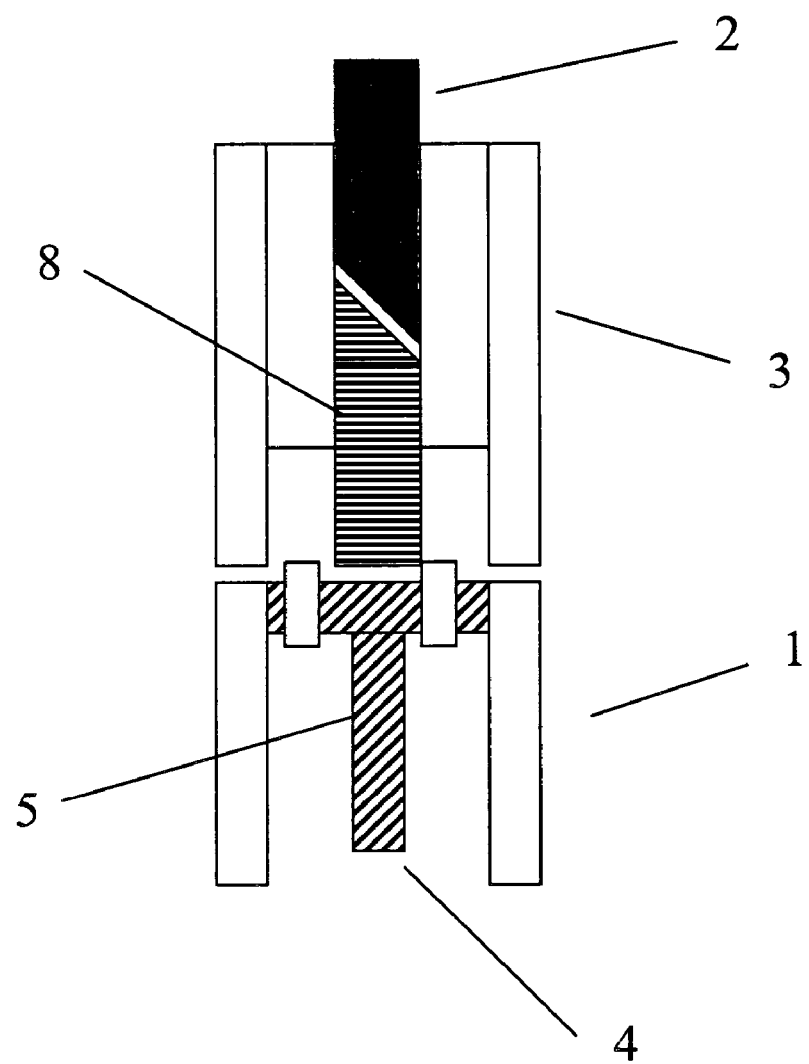
FIG. 1 shows an embodiment of the apparatus for demolding according to present invention with a mold for a sliding mechanism.
Figure 2:
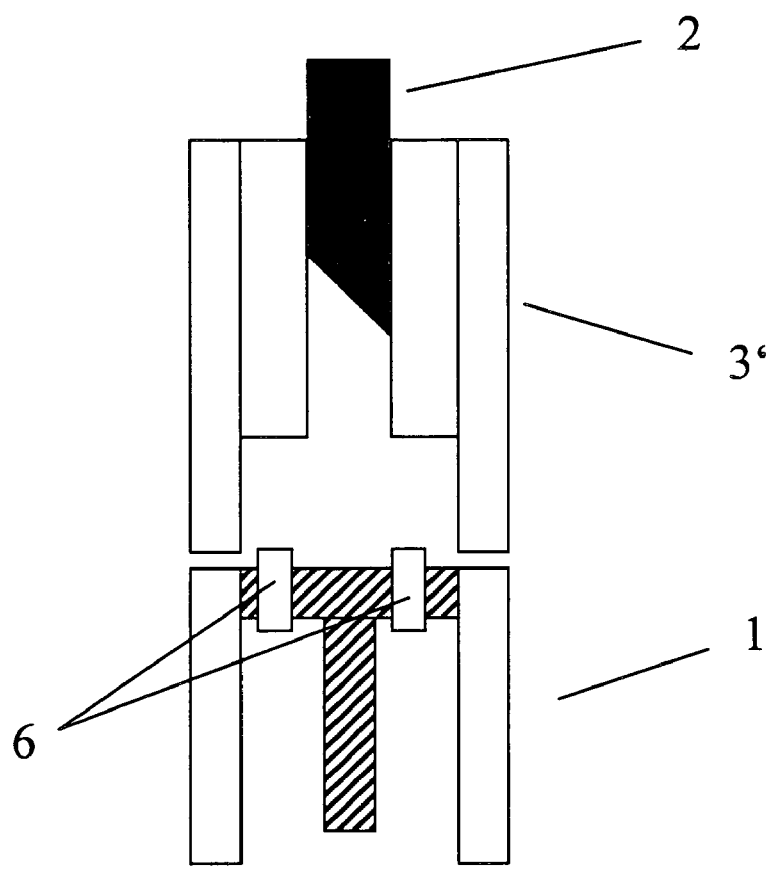
FIG. 2 shows an embodiment of an apparatus for demolding according to the present invention with a mold out of which the molded material is pushed out by means of compressed air.
Figure 3:
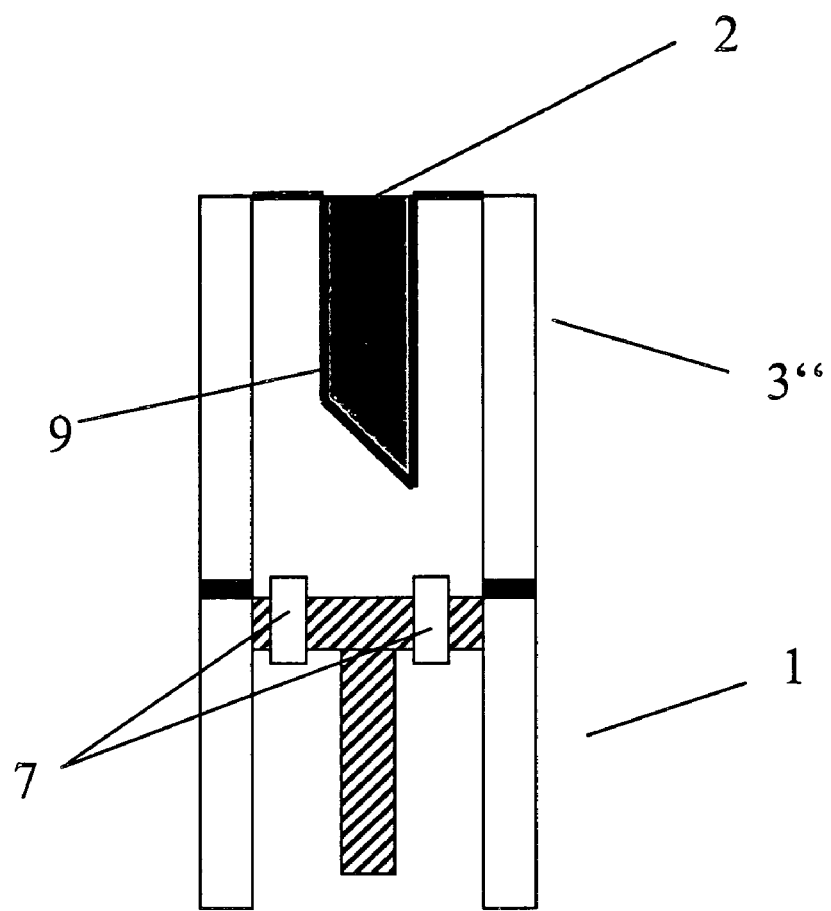
FIG. 3 shows an embodiment of an apparatus for demolding according to the present invention with a mold which is expanded by means of negative pressure.

FIGS. 1 to 3 show exemplary one embodiment of the apparatus for demolding 1 according to invention. The apparatus for demolding 1 is suitable to demold modeled material out of different kinds of molds 3. For this, the apparatus for demolding 1 is located at the underside of the mold 3. Depending on the used mold 3, the apparatus for demolding 1 can carry out different techniques for demolding.

In FIG. 1, the apparatus for demolding 1 according to the invention is shown together with the mold 3 which can be demolded by means of sliding mechanism 4. In order to slide out the molded material 2 out of the mold 3, the apparatus for demolding 1 comprises a corresponding sliding mechanism 4. In the present exemplary embodiment, this is a kind of plunger 5 which can be slid into the underside of the mold 3. The plunger can either directly slid out the molded material 2 out of the mold 3 or—as shown in FIG. 1—actuating a mechanism 8 in the mold 3 which pushes the molded material 2 upwards out of the mold 3. After the pushing out of the mold 3, the molded material 2 can be received by a further apparatus (not shown) and provided to further method steps.

FIG. 2 shows the interaction of an apparatus for demolding 1 according to the present invention with a mold 3' according to which a molded material is removed by means of compressed air. For this, the apparatus for demolding 1 comprises at least one opening 6 through which the compressed air which is necessary for demolding can be provided. The openings 6 are preferable located in a way such that the sliding out of the molded material out of the mold, as it is described in connection with FIG. 1, is not hindered by the openings.

FIG. 3 shows a mold 3" with a therein located flexible mold 9, in which the flexible mold 9 is expanded by means of negative pressure provided by the apparatus for demolding 1 such that the molded material 2 located therein can be received by a further apparatus (not shown) and can be provided to further method steps. Such a negative pressure can be provided by different means. In FIG. 3 the apparatus for demolding 1 is formed such that it is located air tight at the underside of the mold 3". By means of at least one opening 7 in the apparatus for demolding 1, a negative pressure achieved in the apparatus for demolding 1 can be passed on to the mold 3" such that the flexible mold 9 is expanded in controlled manner.

Figure 4:
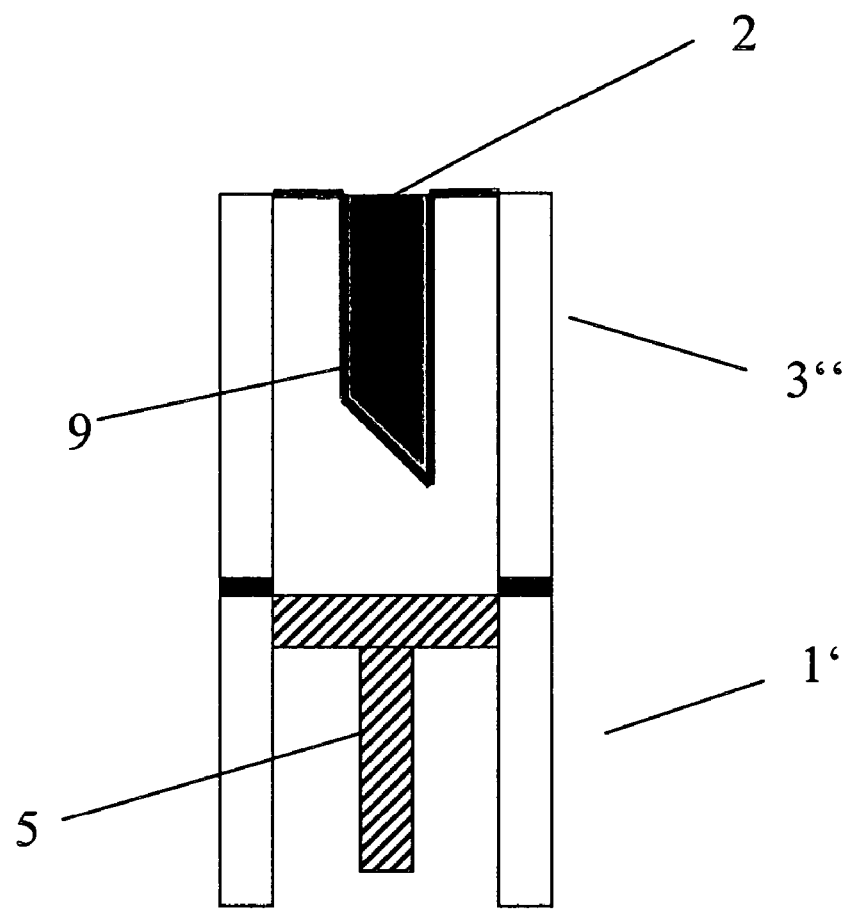
FIG. 4 shows an alternative embodiment of the apparatus for demolding according to the present invention in which the negative pressure is provided with other means.

FIG. 4 shows a further embodiment of the apparatus for demolding 1' according to the present invention. In this embodiment, a negative pressure is achieved by pulling back the plunger 5 in the apparatus for demolding 1 which achieves that the flexible mold 9 in the mold 3" is expanded as desired. By pushing forward the plunger 5, a sliding mechanism may be realized or a compressed air may be provided so that also the other techniques for demolding can be carried out by means of this apparatus.

The apparatus for demolding 1, 1' according to the present invention is preferably used in devices for producing lipstick leads. For that, liquid and hot materials are filled in the mold 3, are cooled down and are removed again out of the mold 3 in hardened and molded condition by means of the apparatus for demolding 1. This enables that the device for producing lipsticks could selectively use one of a plurality of different techniques for demolding. For this, nearly the mold 3 itself must be exchanged, if necessary. For this, the molds 3 are preferably formed such that they have the same dimensions at their outside. In addition, the molds are preferably attached to the device such that they can be released and attached again easily.

Depending on the inserted mold 3, either the user of the device chooses manually the correct demolding technique or the device detects the inserted mold 3 and uses correspondingly the apparatus for demolding 1 in an appropriate way.

The invention claimed is:

1. An apparatus for demolding of molded materials out of a mold, in particular for demolding lipstick leads, wherein said apparatus for demolding comprises a sliding mechanism adapted to select between sliding the molded material out of the mold, and defining at least one opening for providing compressed air through the opening for pushing the molded material out of the mold, and providing negative pressure for expanding a flexible mold in the mold.

2. The apparatus according to claim 1, wherein said apparatus for demolding further comprises of means for selectively demolding with one of at least three different techniques.

3. The apparatus according to the claim 2, wherein said sliding mechanism comprises a plunger for sliding out the molded material.

4. The apparatus according to claim 1 wherein one technique for removing the molded material the mold is expanded by negative pressure.

5. The apparatus according to claim 4 wherein said apparatus comprises at least one opening through which the negative pressure for expanding the mold may be provided.

6. The apparatus according to claim 1, wherein said apparatus comprises a plunger for sliding out the molded material out of the mold, wherein the plunger comprises at least one opening through which selectively compressed air for pushing out the molded material out of the mold or a negative pressure for expanding the mold may be provided.

7. The apparatus according to claim 1, wherein said apparatus comprises of means for removing molded material out of the mold after the demolding.

8. The apparatus according to claim 1, wherein said apparatus comprises means for automatically changing the technique for demolding.

9. A device according to claim 1 for producing lipstick leads from a liquid material wherein the device for producing comprises an apparatus for demolding.

* * * * *

UNITED STATES PATENT AND TRADEMARK OFFICE
CERTIFICATE OF CORRECTION

PATENT NO. : 7,833,004 B2
APPLICATION NO. : 11/578082
DATED : November 16, 2010
INVENTOR(S) : Franz Xaver Gilg It is certified that error appears in the above-identified patent and that said Letters Patent is hereby corrected as shown below:

Column 4, Claim 7, line 34, delete "comprises of mean" and add -- comprises mean --.

Signed and Sealed this
Fourteenth Day of June, 2011

David J. Kappos
*Director of the United States Patent and Trademark Office*